United States Patent
Watsen (10) Patent No.: US 8,868,913 B1
(45) Date of Patent: Oct. 21, 2014

(54) AUTOMATICALLY AUTHENTICATING A HOST KEY VIA A DYNAMICALLY GENERATED CERTIFICATE USING AN EMBEDDED CRYPTOGRAPHIC PROCESSOR

(75) Inventor: Kent A. Watsen, Leesburg, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 72 days.

(21) Appl. No.: 13/248,569

(22) Filed: Sep. 29, 2011

(51) Int. Cl.
*H04L 29/06* (2006.01)

(52) U.S. Cl.
USPC ............... 713/175; 713/155; 713/171; 726/1; 726/12; 726/27; 709/227; 709/229

(58) Field of Classification Search
USPC ......... 709/229, 227; 713/175, 15, 171; 726/1, 726/12, 27
See application file for complete search history.

(56) References Cited

U.S. PATENT DOCUMENTS

| | | | | |
|---|---|---|---|---|
| 5,970,147 | A * | 10/1999 | Davis ........................... | 713/172 |
| 6,954,438 | B2 * | 10/2005 | Morley et al. ................. | 370/278 |
| 7,194,010 | B2 * | 3/2007 | Beasley et al. ................ | 370/503 |
| 8,161,554 | B2 * | 4/2012 | Sadhasivam et al. ........... | 726/23 |
| 2002/0144108 | A1 * | 10/2002 | Benantar ....................... | 713/156 |
| 2002/0144117 | A1 * | 10/2002 | Faigle ........................... | 713/169 |
| 2008/0211624 | A1 * | 9/2008 | Micali et al. .................. | 340/5.6 |
| 2009/0125633 | A1 | 5/2009 | Watsen et al. ................. | 709/229 |
| 2009/0150974 | A1 * | 6/2009 | Cho et al. ...................... | 726/2 |
| 2011/0093396 | A1 * | 4/2011 | Parkos et al. .................. | 705/63 |
| 2013/0126606 | A1 * | 5/2013 | Smith ........................... | 235/379 |

OTHER PUBLICATIONS

Igoe, K. et al., "X.509v3 Certificates for Secure Shell Authentication", Internet Engineering Task Force (IETF), Request for Comments: 6187, Category: Standards Track, ISSN: 2070-1721, http://www.rfc-editor.org/info/rfc6187, Mar. 2011, 16 pages.

* cited by examiner

*Primary Examiner* — Mohammad A Siddiqi
(74) *Attorney, Agent, or Firm* — Harrity & Harrity, LLP

(57) ABSTRACT

A network device initiates a transmission control protocol (TCP) connection to establish a TCP session with a management device, and performs, via the TCP session, a secure protocol client/server role reversal for the management device. The network device receives, from the management device, initiation of a secure connection over the TCP session in accordance with a secure protocol, and provides, to the management device, a trusted certificate with an embedded host key that is dynamically generated using a cryptographic processor of the network device, based on the initiation of the secure connection. The network device also establishes the secure connection with the management device based on an authentication of the host key by the management device via the trusted certificate.

24 Claims, 7 Drawing Sheets

AUTOMATICALLY AUTHENTICATING A HOST KEY VIA A DYNAMICALLY GENERATED CERTIFICATE USING AN EMBEDDED CRYPTOGRAPHIC PROCESSOR

BACKGROUND

Due to increasing reliance on network-accessible devices, network security has become a major issue for organizations and individuals. To help ensure the security of their devices, organizations and individuals frequently install security devices between their private networks and public networks. A security device attempts to prevent unwanted or malicious information generated by the public network from affecting devices in the private network. The security device may also provide network address translation (NAT) functionality, which enables the private network to utilize a single public Internet protocol (IP) address when communicating with the public network. NAT may provide further security from the public network by obscuring the internal structure of the private network from the public network, as well as, reduce costs associated with maintaining a public IP address for each device located within the private network.

One example of a commonly deployed security device is a firewall. A firewall may perform NAT by re-writing the source and/or destination IP addresses included within packets that flow through the firewall. Upon receiving a packet from a private network device designated for the public network, the firewall, for example, re-writes the private IP source address assigned to the private network device with the single public IP address. Upon receiving a return packet in response to the private network device's packet, the firewall re-writes the destination address of the return packet with the appropriate private IP address. In this manner, the firewall obscures the internal structure of the private network by making it appear that only one device, e.g., the firewall, sends and receives data via the single public IP address.

While a firewall that performs NAT may obscure the structure of the private network and thereby provides added security, the firewall may also prevent the private network devices from participating in certain network protocols. For example, a private network device behind a NAT firewall may not act as a transmission control protocol (TCP) server. That is, the private network device may not be able to directly receive and accept a TCP session request from a management device on the public side of the NAT firewall because the IP address of the private network device itself is not known by management devices on the public side of the firewall. The management device only knows the single public IP address used by the firewall. Because TCP requires a management device to know of the IP address of the particular network device with which the TCP session is to be established, the management device cannot directly establish a TCP session with the network device behind the NAT firewall. Moreover, many of the secure protocols that operate over a TCP session may not be utilized, as these secure protocols depend on the TCP session.

Some techniques may be employed that enable a management device on one side of the security device, which may implement port mapping, to establish a secure session (e.g., a secure shell (SSH) protocol session) with a network device on the other side of the security device such that the secure session roles are correctly assigned between the management device and the network device. With such techniques, the management device and the network device may dynamically switch roles as a networking stack is instantiated on the devices for supporting the secure protocol session. For example, the techniques allow the network device to proactively initiate a TCP session with the management device as a TCP client and, upon establishing the TCP session, dynamically switch roles so as to allow the management device to act as a client for any secure communication protocol running on top of the TCP.

In this way, the management device can be properly configured to act as a SSH client and the network device can be configured to act as a SSH server. By properly initiating the SSH secure session from the management device, the secure SSH session can be established in a manner that is correct in terms of the roles each of the network device and the management device perform. Thus, network administrators may more consistently configure the network device and the management device, thereby better assuring both performance and security within the network.

For example, a network device on a private side of a NAT firewall initiates a TCP connection to establish a TCP session with a management device on a public side of the NAT firewall such that the management device accepts the TCP session as a TCP server and the network device acts as a TCP client. In this way, the limitations or restrictions introduced by the NAT firewall can be avoided. After establishing the underlying TCP session in this manner, the network device sends a role reversal message to the management device via the TCP session. The role reversal message specifies an identity of the network device and provides the management device with the ability to securely initiate the secure session, and thereby reverse the client/server roles with respect to the secure session from that of the underlying TCP session.

Upon receiving the role reversal message, the management device initiates a secure connection over the TCP session in accordance with a secure protocol such that the management device acts as the secure protocol client and the network device acts as the secure protocol server. The secure protocol, such as the SSH protocol, enables the secure protocol server (i.e., the network device) to provide a public key (e.g., a SSH host key) to the secure protocol client (i.e., the management device). The SSH host key may provide authentication credentials for the secure protocol server (i.e., the network device) so that the secure protocol server may be authenticated by the secure protocol client. The secure protocol client (i.e., the management device) may receive the SSH host key, and may verify or authenticate the SSH host key by comparing the SSH host key to a database of previously-received SSH host keys. If the SSH host key is verified, the network device and the management device may establish a secure connection between each other over the TCP session.

However, if this is the first time a secure connection is initiated between the network device and the management device, the management device may not be able to verify the SSH host key since the SSH host key will not be present in the database of previously-received SSH host keys. Such a scenario may exist when a new network device is installed in a private network. In such a situation, an end user (e.g., a network administrator) of the network device may be required to manually authenticate the network device, which may take an inordinate amount of time (e.g., a few days). The manual process may involve the end user manually generating a certificate signing request (CSR) for the SSH host key, and manually providing the CSR to a certificate authority (CA) having a chain of trust to a trusted CA. The end user may request that the CA sign the CSR so that a signed, trusted certificate with the SSH host key embedded therein may be created. The end user may then manually load the signed, trusted certificate to the network device. The signed, trusted certificate may enable the management device to verify the SSH host key, and a secure connection may be established between the network device and the management device.

In another manual process, the end user may manually retrieve a fingerprint of the SSH host key. However, this manual process is onerous since it must be performed on a per-device and per-user basis.

SUMMARY

According to one aspect, a method may include initiating, by a network device, a transmission control protocol (TCP) connection to establish a TCP session with a management device, and performing, via the TCP session, a secure protocol client/server role reversal for the management device. The method may also include receiving, by the network device and from the management device, initiation of a secure connection over the TCP session in accordance with a secure protocol, and providing, by the network device and to the management device, a trusted certificate with an embedded host key that is dynamically generated using a cryptographic processor of the network device, based on the initiation of the secure connection. The method may further include establishing, by the network device, the secure connection with the management device based on an authentication of the host key by the management device via the trusted certificate.

According to another aspect, a network device may include a processor to initiate a transmission control protocol (TCP) connection to establish a TCP session with a management device, and perform, via the TCP session, a secure protocol client/server role reversal for the management device. The processor may also receive, from the management device, initiation of a secure connection over the TCP session in accordance with a secure protocol, and may provide, to the management device, a trusted certificate with an embedded host key that is dynamically generated using a cryptographic processor of the network device, based on the initiation of the secure connection. The processor may further establish the secure connection with the management device based on an authentication of the host key by the management device via the trusted certificate.

According to still another aspect, one or more computer-readable media may include one or more instructions that, when executed by a processor if a device, cause the processor to: initiate a transmission control protocol (TCP) connection to establish a TCP session with a management device; perform, via the TCP session, a secure protocol client/server role reversal for the management device; receive, from the management device, initiation of a secure connection over the TCP session in accordance with a secure protocol; provide, to the management device, a trusted certificate with an embedded host key that is dynamically generated using a cryptographic processor of the device, based on the initiation of the secure connection; and establish the secure connection with the management device based on an authentication of the host key by the management device via the trusted certificate.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Systems and/or methods described herein may enable a network device to be automatically authenticated by a management device when a secure protocol is implemented between the network device and the management device. For example, the secure protocol may be initially implemented when the network device is installed, powered on, and initialized. The network device may include a secure cryptographic processor that contains a unique (e.g., device specific) private key and a matching trusted certificate signed by a CA that has a chain of trust to a trusted CA. The network device may dynamically generate a public key (e.g., a SSH host key) and may automatically generate a CSR, containing the public key, when a secure protocol is initiated between the network device and the management device. The cryptographic processor may utilize its private key to sign the CSR and to produce another trusted certificate with the embedded public key. The network device may provide the other trusted certificate with the embedded public key to the management device. The management device may automatically authenticate the public key embedded in the other trusted certificate since the certificate is signed by a CA trusted by the management device. A secure connection may then be established between the network device and the management device.

In an example implementation, the network device may power on and/or initialize its components, and may initiate a TCP connection to establish a TCP session with the management device. A secure protocol client/server role reversal may be performed for the network device and the management device via the TCP session. The network device may receive, from the management device, initiation of a secure connection over the TCP session in accordance with a secure protocol. The network device may provide, to the management device, a trusted certificate with an embedded host key, that is dynamically generated using a cryptographic processor, based on the initiation of the secure connection, and may establish a secure connection with the management device based on the automatic authentication of the host key by the management device via the trusted certificate.

Figure 1:
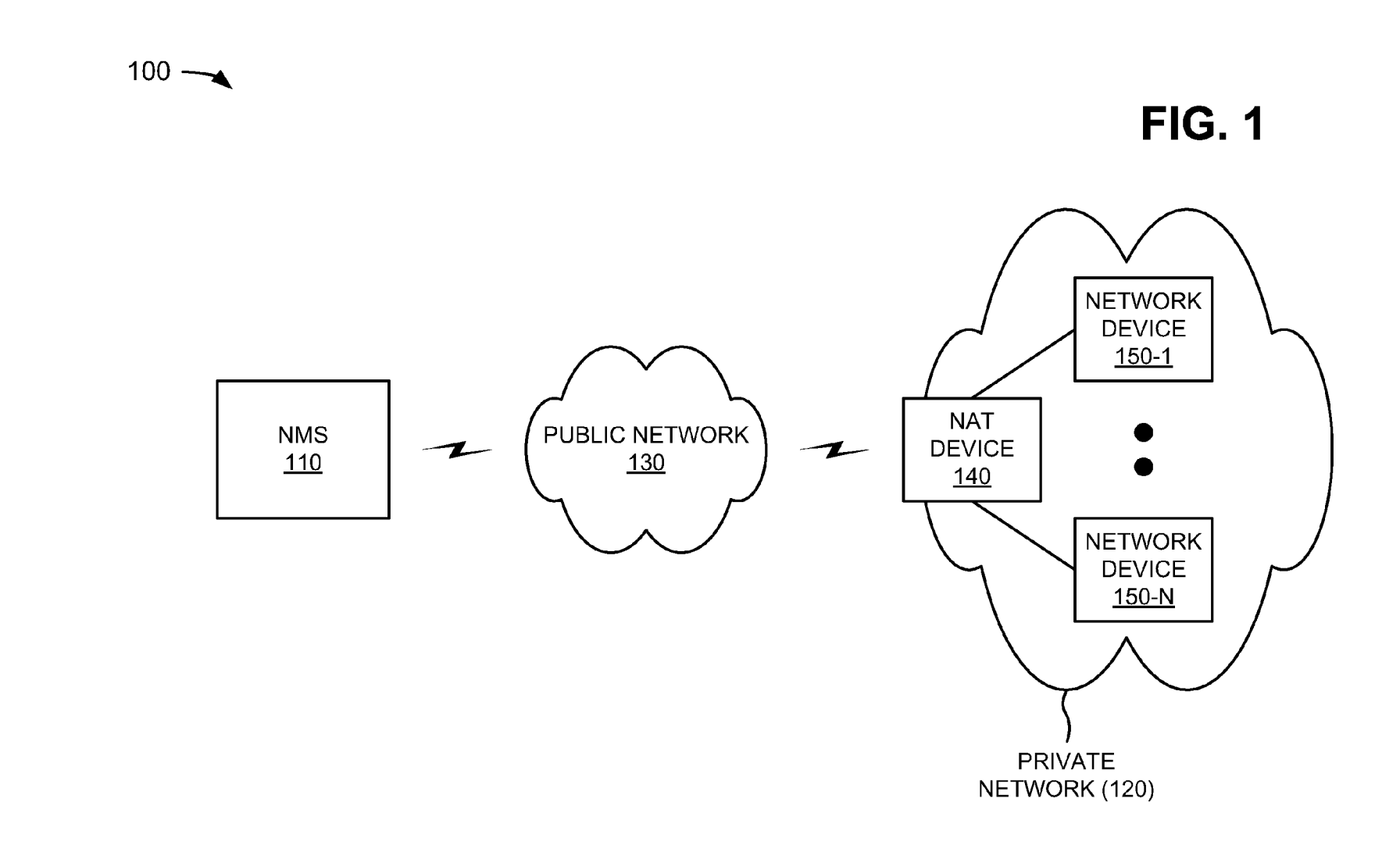
FIG. 1 is a diagram of an example network in which systems and/or methods described herein may be implemented.

FIG. 1 is a diagram of an example network 100 in which systems and/or methods described herein may be implemented. As illustrated, network 100 may include a network management system (NMS) 110 and a private network 120 interconnected by a public network 130. Private network 120 may include a NAT device 140 and one or more network devices 150-1 through 150-N (collectively referred to herein as "network devices 150," and, in some instances, singularly as "network device 150"). Devices of network 100 may interconnect via wired and/or wireless connections or links A single NMS 110, a single private network 120, a single public network 130, a single NAT device 140, and two network devices 150 have been illustrated in FIG. 1 for simplicity. In practice, there may be additional NMSs 110, private networks 120, public networks 130, NAT devices 140, and/or network devices 150. Also, in some instances, one or more of the devices/networks of network 100 may perform one or more tasks described as being performed by another one or more of the devices/networks of network 100.

NMS 110 may include any device that is capable of accessing network devices 150 via public network 130 and/or NAT device 140. For example, NMS 110 may include: a radiotelephone; a personal communications system (PCS) terminal that may combine a cellular radiotelephone with data processing and data communications capabilities; a personal digital assistant (PDA) that includes one or more of a radiotelephone, a pager, Internet/intranet access, etc.; a smart phone; a workstation computer; a laptop computer; a personal computer; or another type of computation or communication device. In one example implementation, NMS 110 may be provided within public network 130 or may be external to public network 130.

Private network 120 may include a local area network (LAN), a company intranet, or another type of protected network. Private network 120 may also include organizational components, devices, servers, etc., such as NAT device 140, network devices 150, server devices (not shown in FIG. 1), etc. In one example, private network 120 may include a network that uses public network 130 to provide remote NMSs 110 with secure access to network resources provided in private network 120.

Public network 130 may include a publicly accessible network, such as a local area network (LAN); a wide area network (WAN); a metropolitan area network (MAN); a telephone network (e.g., the Public Switched Telephone Network (PSTN) or a cell network); the Internet; or a combination of networks.

NAT device 140 may include a network security device that provides NAT functionality and protects devices of private network 120 (e.g., network devices 150) from public network 130. In one example, NAT device 140 may include a gateway, a router, a switch, a firewall, etc. NAT device 140 may perform security operations in order to protect network devices 150 from attacks originating from public network 130. NAT device 140 may perform NAT by re-writing the source and/or destination IP addresses included within packets that flow through NAT device 140. Upon receiving a packet from a network device 150 designated for public network 130, NAT device 140 may re-write a private IP source address assigned to network device 150 with a single public IP address. Upon receiving a return packet in response to the packet from network device 150, NAT device 140 may re-write the destination address of the return packet with the appropriate private IP address. In this manner, NAT device 140 may obscure the internal structure of private network 120 by making it appear that only one device, e.g., NAT device 140, sends and receives data via the single public IP address.

Network device 150 may include a traffic transfer device, such as a gateway, a router, a switch, a firewall, a network interface card (NIC), a hub, a bridge, a proxy server, an optical add-drop multiplexer (OADM), or some other type of device that processes and/or transfers traffic (e.g., packets). In one example implementation, network device 150 may communicate with and be remotely configured by management devices (e.g., NMS 110) associated with public network 130. However, when network device 150 is powered on for the first time, NMS 110 may not be aware of network device 150 because network device 150 may be provided behind NAT device 140. NAT device 140 may not provision an external address or port for network device 150 to connect, or may not permit secure access, such as SSH access, to private network 120. Alternatively, or additionally, NMS 110 may be unaware of network device 150 when network device 150 is configured in stealth mode with no open portions; when network device 150 has a dynamically assigned IP address that is not registered; etc.

Thus, network device 150 may need to identify and/or authenticate itself to NMS 110 when network device 150 is powered on for the first time or connected to private network 120 for the first time. In an example implementation, network device 150 may power on and/or initialize its components, may generate a private key and a public key (e.g., a host key), and may initiate a TCP connection to establish a TCP session with NMS 110. Network device 150 may provide, to NMS 110 and via the TCP session, a role reversal message specifying an identity of network device 150, and may receive, from NMS 110, initiation of a secure connection over the TCP session in accordance with a secure protocol, such as the SSH protocol. Based on the initiation of the secure connection, network device 150 may generate a CSR that includes the host key embedded therein, and may provide the CSR to a cryptographic processor of network device 150. The cryptographic processor may sign the CSR to generate a trusted certificate with the embedded host key. Network device 150 may provide, to NMS 110, the trusted certificate with the embedded host key, and may establish a secure connection with NMS 110 based on the automatic authentication of the host key by NMS 110 via the trusted certificate.

Further details of network device 150 are provided below in connection with, for example, FIGS. 3-7.

Although FIG. 1 shows example devices/networks of network 100, in other implementations, network 100 may include fewer devices/networks, different devices/networks, differently arranged devices/networks, or additional devices/networks than depicted in FIG. 1.

Figure 2:
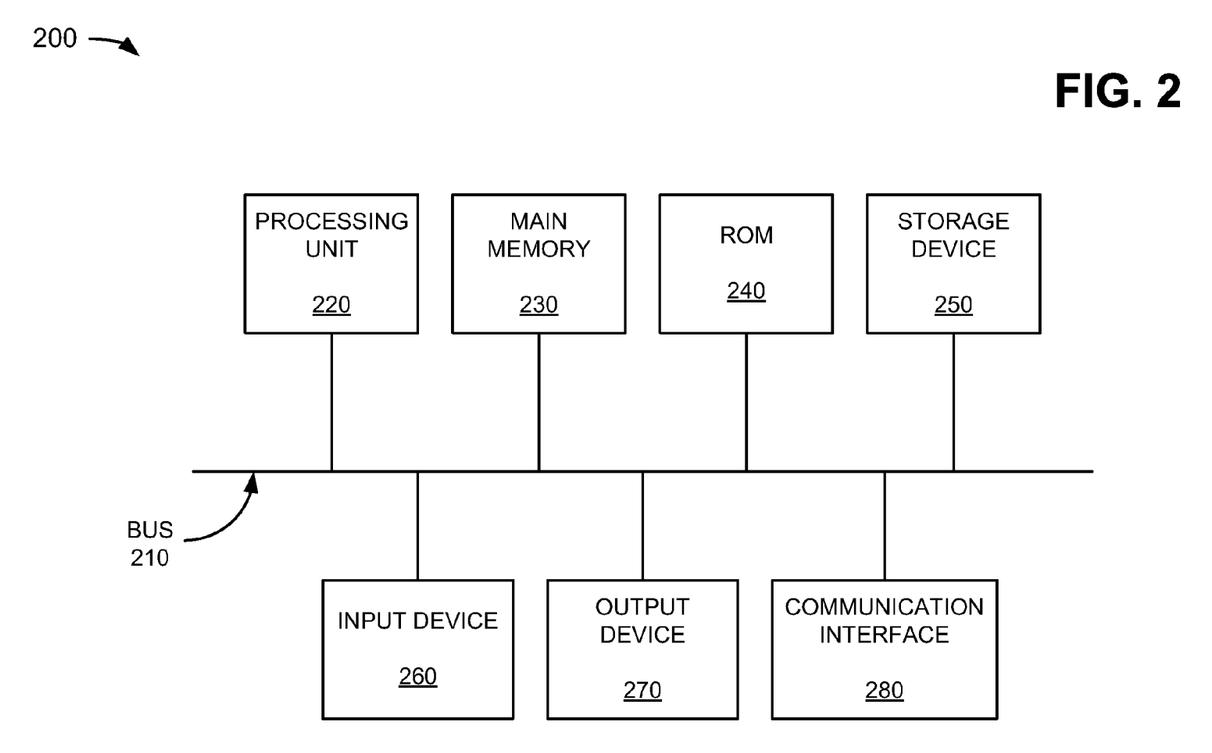
FIG. 2 is a diagram of example components of a network management system (NMS) or a NAT device depicted in FIG. 1.

FIG. 2 is a diagram of example components of a device 200 that may correspond to NMS 110 or NAT device 140 (FIG. 1). In some instances, device 200 may also correspond to network device 150 (FIG. 1). Each of NMS 110, NAT device 140, or network device 150 may include one or more devices 200 or one or more components of device 200. As illustrated in FIG. 2, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, application-specific integrated circuit (ASICs), field-programmable gate arrays (FPGAs), or other types of processing units that interpret and execute instructions. Main memory 230 may include a RAM or another type of dynamic storage device that stores information and instructions for execution by processing unit 220. ROM 240 may include a ROM device or another type of static storage device that stores static information and/or instructions for use by processing unit 220. Storage device 250 may include a magnetic and/or optical recording medium and its corresponding drive, or a removable memory, such as a flash memory.

Input device 260 may include a mechanism that permits an operator to input information to device 200, such as a keyboard, a mouse, a switch, a button, voice recognition and/or biometric mechanisms, a touch screen, etc. Output device 270 may include a mechanism that outputs information to the operator, including a display, a speaker, a light emitting diode (LED), etc. Communication interface 280 may include any transceiver-like mechanism that enables device 200 to communicate with other devices and/or systems. For example, communication interface 280 may include mechanisms for communicating with another device or system via a network. In one implementation, communication interface 280 may include a wired interface, such as an Ethernet interface, or a wireless interface, such as radio frequency interface.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
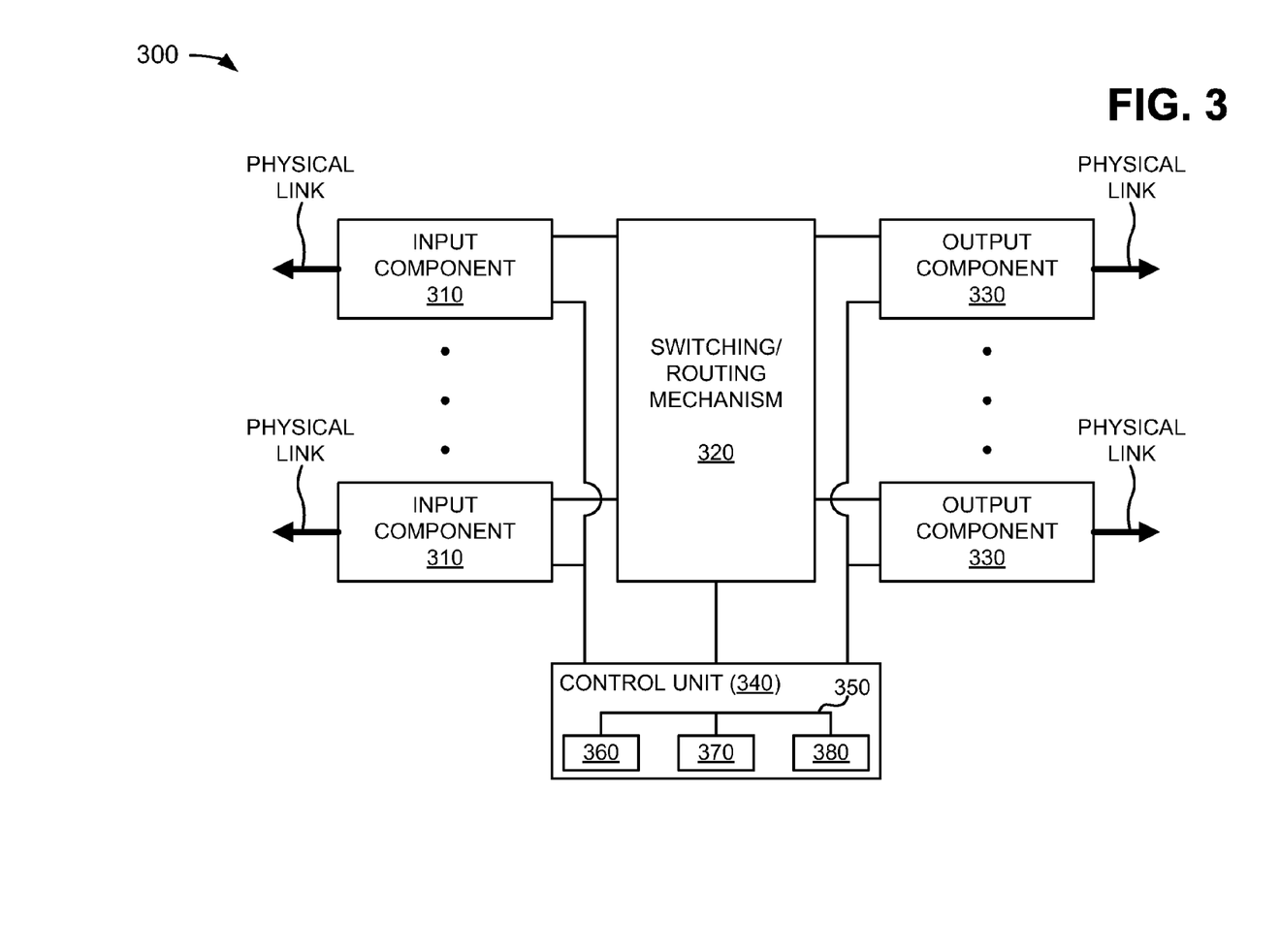
FIG. 3 is a diagram of example components of a network device depicted in FIG. 1.

FIG. 3 is a diagram of example components of a device 300 that may correspond to network device 150 (FIG. 1). In some instances, network device 150 may include one or more devices 300. As shown in FIG. 3, device 300 may include input components 310, a switching/routing mechanism 320, output components 330, and a control unit 340.

Input components 310 may be a point of attachment for physical links and may be a point of entry for incoming traffic, such as packets. Input components 310 may process incoming traffic, such as by performing data link layer encapsulation or decapsulation. In an example implementation, input components 310 may send and/or receive packets.

Switching/routing mechanism 320 may interconnect input components 310 with output components 330. Switching/routing mechanism 320 may be implemented using many different techniques. For example, switching/routing mechanism 320 may be implemented via busses, via crossbars, and/or with shared memories. The shared memories may act as temporary buffers to store traffic from input components 310 before the traffic is eventually scheduled for delivery to output components 330.

Output components 330 may store packets and may schedule packets for service on output physical links Output components 330 may include scheduling algorithms that support priorities and guarantees. Output components 330 may support data link layer encapsulation and decapsulation, and/or a variety of higher-level protocols. In an example implementation, output components 330 may send packets and/or receive packets.

Control unit 340 may use routing protocols and one or more forwarding tables for forwarding packets. Control unit 340 may connect with input components 310, switching/routing mechanism 320, and output components 330. Control unit 340 may compute a forwarding table, implement routing protocols, and/or run software to configure and manage device 300. Control unit 340 may determine routing for any packet whose destination address may not be found in the forwarding table.

In an example implementation, control unit 340 may include a bus 350 that may include a path that permits communication among a processor 360, a memory 370, and a communication interface 380. Processor 360 may include one or more processors, microprocessors, ASICs, FPGAs, or other types of processing units that may interpret and execute instructions. Memory 370 may include a RAM, a ROM device, a magnetic and/or optical recording medium and its corresponding drive, and/or another type of static and/or dynamic storage device that may store information and instructions for execution by processor 360. Memory 370 may also temporarily store incoming traffic (e.g., a header of a packet or an entire packet) from input components 310, for processing by processor 360, before a packet is directed back to switching/routing mechanism 320, transported by switching/routing mechanism 320, and eventually scheduled to be sent to output components 330. Communication interface 380 may include any transceiver-like mechanism that enables control unit 340 to communicate with other devices and/or systems.

As described herein, device 300 may perform certain operations in response to processor 360 executing software instructions contained in a computer-readable medium, such as memory 370. The software instructions may be read into memory 370 from another computer-readable medium, such as a data storage device, or from another device via communication interface 380. The software instructions contained in memory 370 may cause processor 360 to perform processes described herein. Alternatively, hardwired circuitry may be used in place of or in combination with software instructions to implement processes described herein. Thus, implementations described herein are not limited to any specific combination of hardware circuitry and software. For example, switching/routing operations of device 300 may be controlled via external agents using routing protocols (e.g., BGP).

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
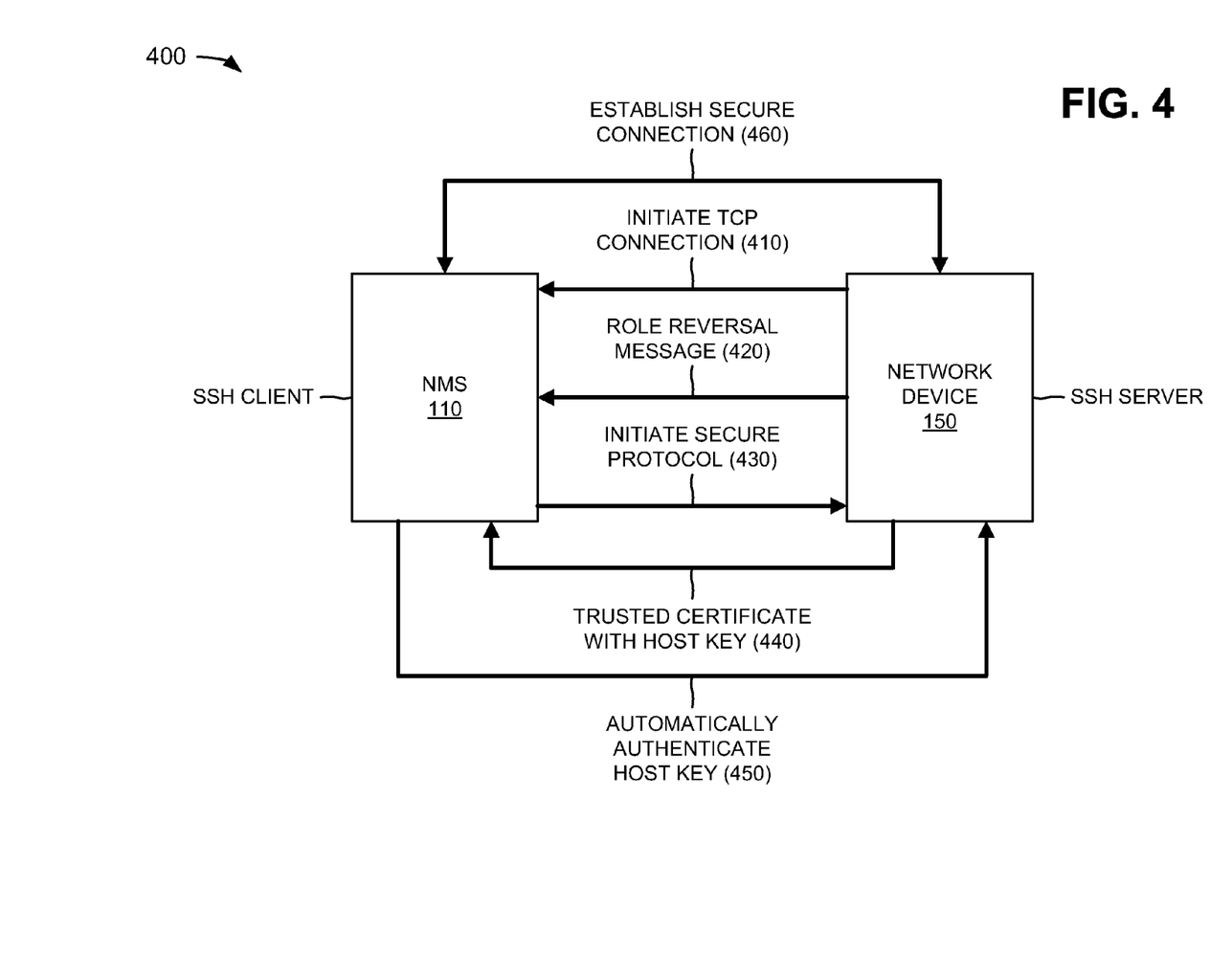
FIG. 4 is a diagram of example operations capable of being performed by an example portion of the network illustrated in FIG. 1.

FIG. 4 is a diagram of example operations capable of being performed by an example portion 400 of network 100. As shown, example network portion 400 may include NMS 110 and network device 150. NMS 110 and network device 150 may include the features described above in connection with, for example, one or more of FIGS. 1-3.

In one example, NMS 110 may execute a management application to facilitate management of networking elements, such as network devices 150, especially when a large number of network devices 150 are under management of a single organization or network. The management application may implement server initiated secure network connection techniques described herein in order to securely manage network devices 150. In particular, the management application may enable NMS 110 to establish a secure session, such as a SSH protocol session, with network devices 150 such that the SSH roles may be correctly assigned between NMS 110 and one of network devices 150. That is, NMS 110 may act as a SSH client and the one of network devices 150 may act as a SSH server.

It may be assumed in the example depicted in FIG. 4 that network device 150 is powered on for the first time or connected to private network 120 for the first time. After powering on, network device 150 may initialize the components of network device 150 and may generate a private key and a public key (e.g., a SSH host key). As shown in FIG. 4, network device 150 may initiate a TCP connection 410 to establish a TCP session with NMS 110. NMS 110 may accept the TCP session as a TCP server and network device 150 may act as a TCP client. After establishing the TCP session, network device 150 may provide a role reversal message 420 to NMS 110. Role reversal message 420 may specify an identity of network device 150 and may provide NMS 110 with information necessary to securely initiate and establish a secure protocol session on top of the TCP session, and thereby reverse the client/server roles with respect to the secure session from that of the underlying TCP session.

In one implementation, role reversal message 420 may not be required to reverse the secure protocol client/server roles of NMS 110 and network device 150. For example, context or a role-reversal flag built into the secure protocol may be used to reverse the secure protocol client/server roles of NMS 110 and network device 150.

Upon receiving role reversal message 420 or after performance of the role reversal, NMS 110 may initiate a secure connection over the TCP session in accordance with a secure protocol (e.g., the SSH protocol), as indicated by reference number 430. As further shown in FIG. 4, in such an arrangement, NMS 110 may act as a secure protocol (SSH) client and network device 150 may act as a secure protocol (SSH) server. When network device 150 receives initiation of the secure connection, network device 150 may generate a CSR based on the generated private key and SSH host key, where the CSR includes the SSH host key embedded therein. Network device 150 may provide the CSR to a cryptographic processor of network device 150, and the cryptographic processor may sign the CSR with a private key stored in the cryptographic processor. The cryptographic processor may also store a first trusted certificate. In one example implementation, the first trusted certificate stored in the cryptographic processor may include an X.509 version 3 (X.509v3) public key certificate for secure shell authentication, as specified by the Internet Engineering Task Force (IETF) in Request for Comments (RFC) 6187. In one example, the first trusted certificate may be signed by a CA with a chain of trust to a CA trusted by NMS 110. The signed CSR may create a second trusted certificate (with the embedded SSH host key), such as another X.509v3 certificate, that is signed by the CA with the chain of trust to the CA trusted by NMS 110.

Network device 150 may provide the second trusted certificate with the embedded SSH host key to NMS 110, as indicated by reference number 440. NMS 110 may receive the second trusted certificate with the embedded SSH host key, and may automatically authenticate the SSH host key since the SSH host key is signed by the CA with a chain of trust to the CA that NMS 110 trusts, as indicated by reference number 450. A secure connection may be established between NMS 110 and network device 150, as indicated by reference number 460, based on the automatic authentication of the SSH host key by NMS 110. In one example, an end user associated with NMS 110 may manage or configure network device 150 via the secure connection established between NMS 110 and network device 150. The automatic authentication of network device 150 may obviate the need for the end user to manually authenticate the network device, which may take an inordinate amount of time (e.g., a few days), as described above.

Although FIG. 4 shows example components of network portion 400, in other implementations, network portion 400 may include fewer components, different components, differently arranged components, or additional components than depicted in FIG. 4. Alternatively, or additionally, one or more components of network portion 400 may perform one or more other tasks described as being performed by one or more other components of network portion 400.

Figure 5:
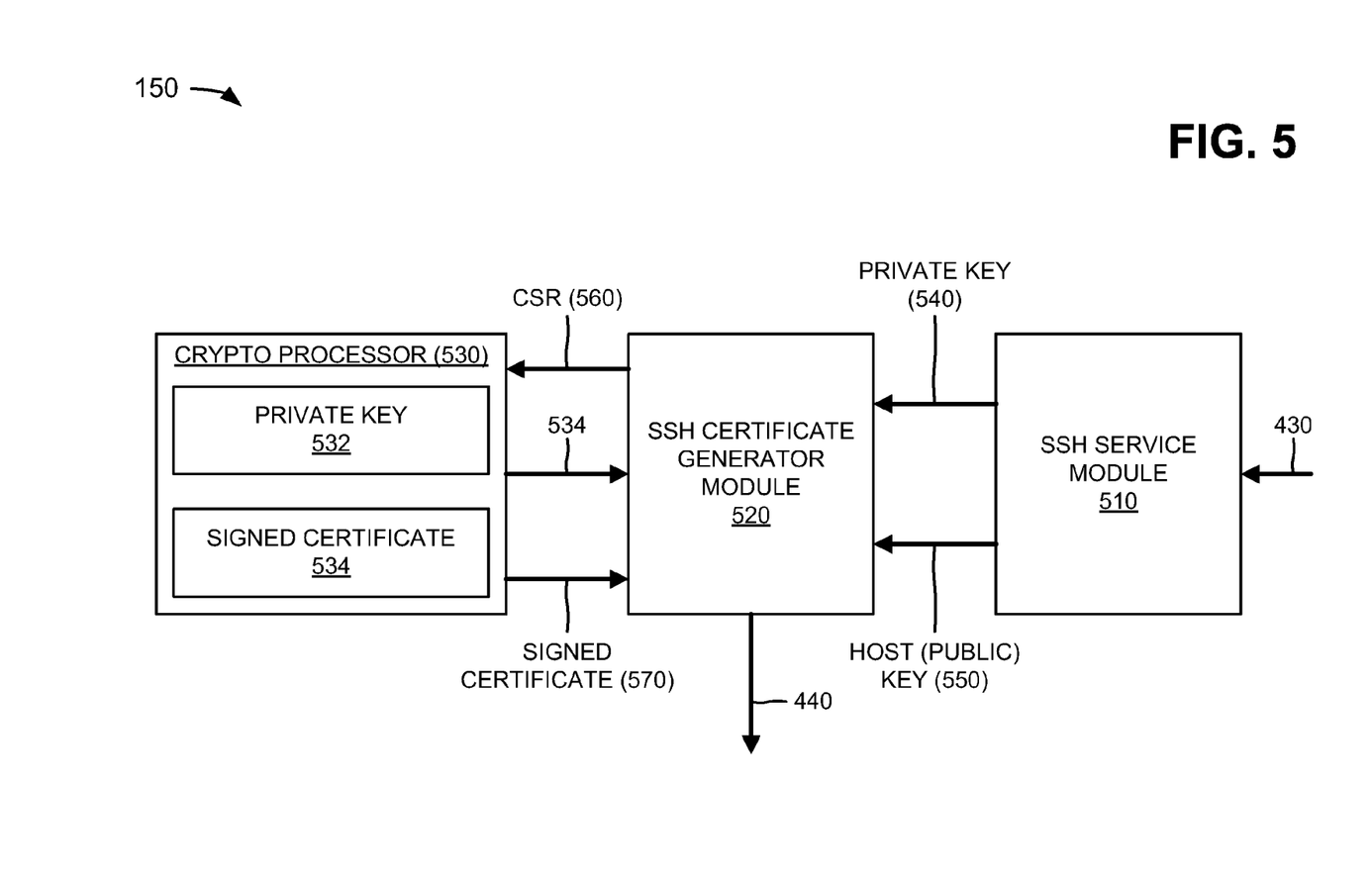
FIG. 5 is a diagram of example functional components of the network device depicted in FIG. 1.

FIG. 5 is a diagram of example functional components of network device 150. As shown, network device 150 may include a SSH service module 510, a SSH certificate generator module 520, and a cryptographic processor 530. In one example implementation, one or more of the functional components described in connection with FIG. 5 may be implemented by one or more of the example components of device 200 (FIG. 2) or device 300 (FIG. 3).

SSH service module 510 may generate a private key 540 and a public key (e.g., a SSH host key 550) when network device 150 is initialized, and may receive initiation 430 of the secure connection. Based on initiation 430 of the secure connection, SSH service module 510 may provide private key 540 and SSH host key 550 to SSH certificate generator module 520.

SSH certificate generator module 520 may receive private key 540 and SSH host key 550 from SSH service module 510, and may generate a CSR 560 based on the generated private key 540 and SSH host key 550. SSH certificate generator module 520 may embed SSH host key 550 in CSR 560. SSH certificate generator module 520 may provide CSR 560 with the embedded SSH host key 550 to cryptographic processor 530.

Cryptographic processor 530 may include a dedicated computer on a chip or a microprocessor for carrying out cryptographic operations. Cryptographic processor 530 may be embedded in a packaging with multiple physical security measures that provide cryptographic processor 530 with a degree of tamper resistance. In one example, cryptographic processor 530 may be provided in network device 150 for anti-counterfeiting purposes. As further shown in FIG. 5, cryptographic processor 530 may include a private key 532 and a signed certificate 534. Private key 532 may be a device specific private key that is unique to network device 150. Signed certificate 534 may be signed by a CA with a chain of trust to a CA trusted by NMS 110, and may be a trusted certificate, such as an X.509v3 certificate.

Cryptographic processor 530 may sign CSR 560 with private key 532 to create a second trusted or signed certificate 570 (with the embedded SSH host key 550), such as another X.509v3 certificate, thus having a chain of trust to the CA trusted by NMS 110. Cryptographic processor 530 may provide signed certificate 534 and signed certificate 570 to SSH certificate generator module 520. SSH certificate generator module 520 may receive signed certificate 534 and signed certificate 570 from cryptographic processor 530, and may provide signed certificate 534 and signed certificate 570 with the embedded SSH host key 550 to NMS 110, as indicated by reference number 440.

Although FIG. 5 shows example functional components of network device 150, in other implementations, network device 150 may include fewer functional components, different functional components, differently arranged functional components, or additional functional components than depicted in FIG. 5. Alternatively, or additionally, one or more functional components of network device 150 may perform one or more other tasks described as being performed by one or more other functional components of network device 150.

Figure 6:
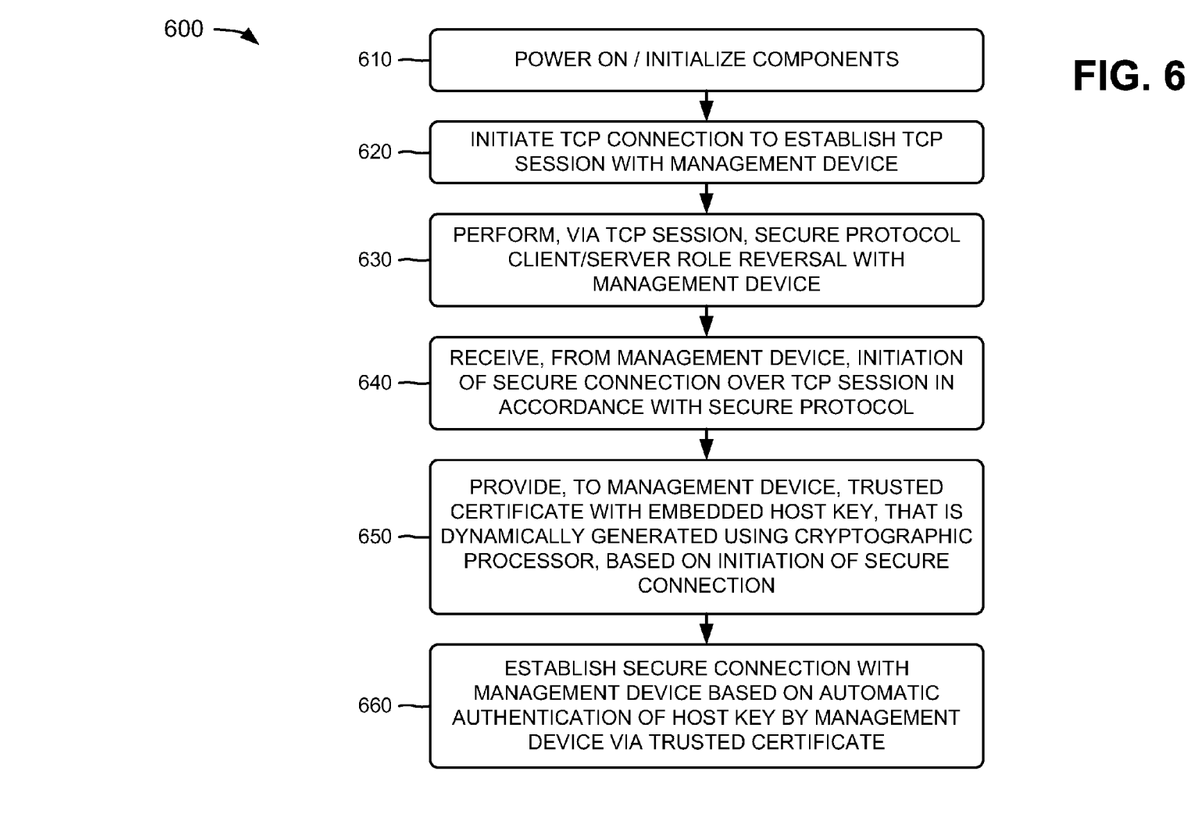
FIGS. 6 and 7 are flow charts of an example process for authenticating a network device via an embedded trusted certificate according to an implementation described herein.
Figure 7:
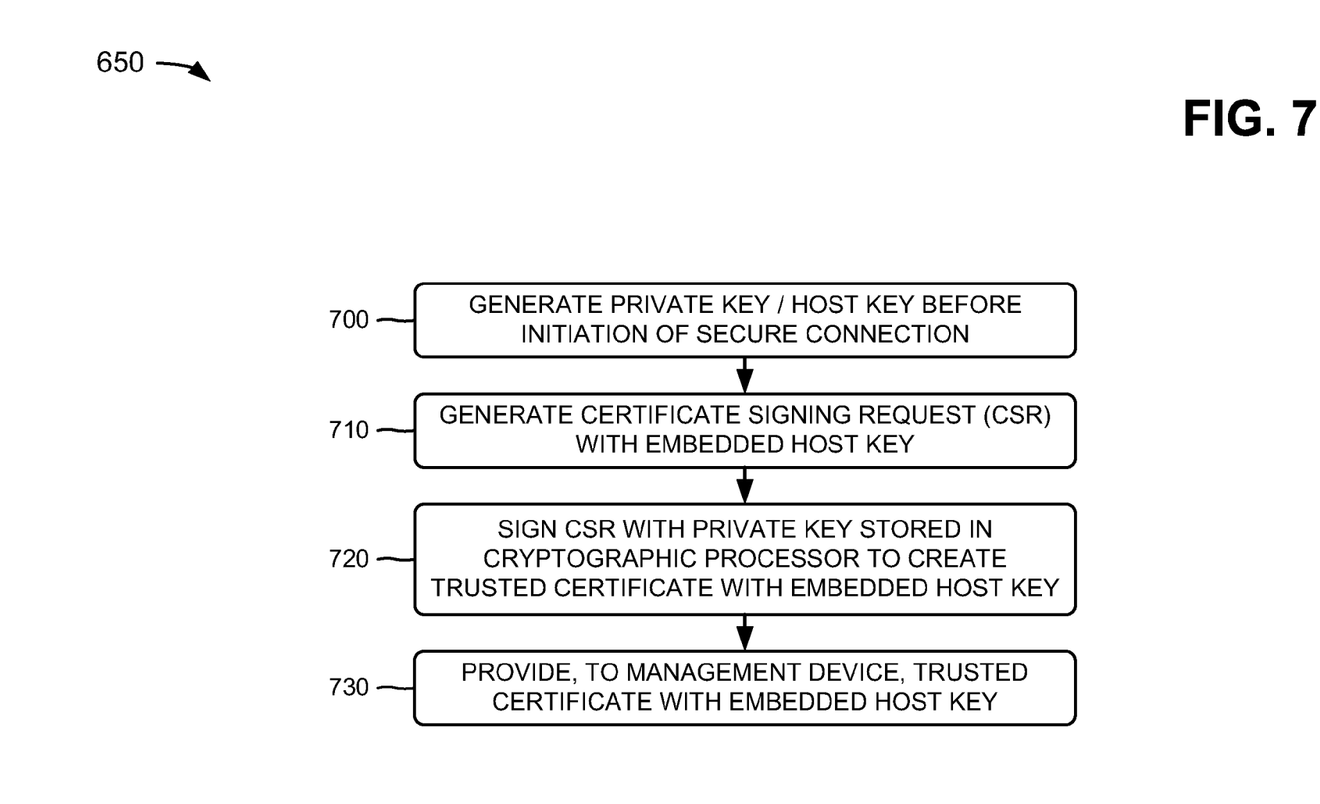

FIGS. 6 and 7 are flow charts of an example process 600 for authenticating a network device via an embedded trusted certificate according to an implementation described herein. In one implementation, process 600 may be performed by network device 150. In another implementation, some or all of process 600 may be performed by one or more devices other than network device 150 or in combination with network device 150. One or more of the process blocks depicted in FIGS. 6 and 7 may be performed concurrently and independently of one or more other process blocks.

As illustrated in FIG. 6, process 600 may include powering on and initializing components of a network device (block 610), and initiating a TCP connection to establish a TCP session with a management device (block 620). For example, in an implementation described above in connection with FIG. 4, it may be assumed that network device 150 is powered on for the first time or connected to private network 120 for the first time. After powering on, network device 150 may initialize the components of network device 150 and may generate a private key and public key (e.g., a host key). Network device 150 may initiate a TCP connection 410 to establish a TCP session with NMS 110. NMS 110 may accept the TCP session as a TCP server and network device 150 may act as a TCP client.

As further shown in FIG. 6, process 600 may include performing, via the TCP session, a secure protocol client/server role reversal with the management device (block 630), and receiving, from the management device, initiation of a secure connection over the TCP session in accordance with the secure protocol (block 640). For example, in an implementation described above in connection with FIG. 4, after establishing the TCP session, network device 150 may provide a role reversal message 420 to NMS 110. Role reversal message 420 may specify an identity of network device 150 and may provide NMS 110 with information necessary to securely initiate and establish a secure protocol session on top of the TCP session, and thereby reverse the client/server roles with respect to the secure session from that of the underlying TCP session. Upon receiving role reversal message 420, NMS 110 may initiate a secure connection over the TCP session in accordance with a secure protocol (e.g., the SSH protocol), as indicated by reference number 430. In such an arrangement, NMS 110 may act as a secure protocol (SSH) client and network device 150 may act as a secure protocol (SSH) server.

Returning to FIG. 6, process 600 may include providing, to the management device, a trusted certificate with an embedded host key, that is dynamically generated using a cryptographic processor, based on the initiation of the secure connection (block 650), and establishing a secure connection with the management device based on an automatic authentication of the host key by the management device via the trusted certificate (block 660). For example, in an implementation described above in connection with FIG. 4, when network device 150 receives initiation of the secure connection, network device 150 may provide the second trusted certificate with the embedded SSH host key to NMS 110, as indicated by reference number 440. NMS 110 may receive the second trusted certificate with the embedded SSH host key, and may automatically authenticate the SSH host key since the SSH host key is signed by the CA with a chain of trust to the CA that NMS 110 trusts, as indicated by reference number 450. A secure connection may be established between NMS 110 and network device 150, as indicated by reference number 460, based on the automatic authentication of the SSH host key by NMS 110.

Process block 650 may include the process blocks depicted in FIG. 7. As shown in FIG. 7, process block 650 may include generating a private key and the host key before initiation of the secure connection (block 700), generating a certificate signing request (CSR) with the embedded host key (block 710), and signing the CSR with private key stored in the cryptographic processor to create the trusted certificate with the embedded host key (block 720). For example, in an implementation described above in connection with FIG. 4, when network device 150 initializes, network device 150 may generate a private key and a public key (e.g., a SSH host key). Network device 150 may generate a CSR that includes a SSH host key embedded therein, and may provide the CSR to a cryptographic processor of network device 150. The cryptographic processor may sign the CSR with a private key stored in the cryptographic processor, and may also store a first trusted certificate. In one example, the first trusted certificate may include an X.509v3 public key certificate for secure shell authentication, and may be signed by a CA with a chain of trust to a CA trusted by NMS 110. The signed CSR may create a second trusted certificate (with the embedded SSH host key), such as another X.509v3 certificate, that also has a chain of trust to the CA trusted by NMS 110.

As further shown in FIG. 7, process block 650 may include providing, to the management device, the trusted certificate with the embedded host key (block 730). For example, in an implementation described above in connection with FIG. 4, network device 150 may provide the second trusted certificate with the embedded SSH host key to NMS 110, as indicated by reference number 440.

Systems and/or methods described herein may enable a network device to be automatically authenticated by a management device when a secure protocol is implemented between the network device and the management device. For example, the secure protocol may be initially implemented when the network device is installed, powered on, and initialized. The network device may include a secure cryptographic processor that contains a unique (e.g., device specific) private key and a matching trusted certificate signed by a CA that has a chain of trust to a trusted CA. The network device may dynamically generate a public key (e.g., a SSH host key) and may automatically generate a CSR, containing the public key, when a secure protocol is initiated between the network device and the management device. The cryptographic processor may utilize the private key to sign the CSR and to produce another trusted certificate with the embedded public key. The network device may provide the other trusted certificate with the embedded public key to the management device. The management device may automatically authenticate the public key embedded in the other trusted certificate since the certificate is signed by a CA trusted by the management device. A secure connection may then be established between the network device and the management device.

The term component, as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

The term packet, as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosed implementations. In fact, many of these features may be combined in ways not specifically recited in the claims and/or disclosed in the specification. Although each dependent claim listed below may directly depend on only one other claim, the disclosed implementations include each dependent claim in combination with every other claim in the claim set.

No element, act, or instruction used in the present application should be construed as critical or essential to the disclosed implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   generating, by a network device, a host key and a private key upon the network device being powered up;
   initiating, by the network device, a transmission control protocol (TCP) connection to establish a TCP session with a management device after generating the host key and the private key;
   performing, via the TCP session, a secure protocol client/server role reversal for the management device;
   receiving, by the network device and from the management device, information indicating initiation of a secure connection over the TCP session in accordance with a secure protocol,
      the secure connection being initiated for a first time between the network device and the management device;
   generating, by the network device, a certificate signing request (CSR) based on the initiation of the secure connection,
      the host key being embedded in the CSR;
   signing, by a cryptographic processor of the network device and with the private key, the CSR to obtain a trusted certificate,
      the private key being provided to the cryptographic processor for storing prior to signing the CSR with the private key;
   providing, by the network device and to the management device, the trusted certificate; and
   establishing, by the network device, the secure connection with the management device based on an authentication of the host key by the management device via the trusted certificate.

2. The method of claim 1, where performing, via the TCP session, the secure protocol client/server role reversal comprises:
   providing, by the network device and to the management device, a role reversal message via the TCP session,
      where the role reversal message provides an identity of the network device.

3. The method of claim 1, where the secure protocol includes a secure shell (SSH) protocol, and the host key includes a SSH host key.

4. The method of claim 1, where the trusted certificate includes an X.509-based public key certificate for secure shell authentication.

5. The method of claim 1, where the private key and another trusted certificate are stored by the cryptographic processor of the network device.

6. The method of claim 5, where the other trusted certificate includes an X.509-based public key certificate for secure shell authentication.

7. The method of claim 1, where the trusted certificate is signed by a first certificate authority (CA) with a chain of trust to a second CA trusted by the management device.

8. A network device, comprising:
   a processor to:
      generate a private key upon the network device being powered up,
      initiate a transmission control protocol (TCP) connection to establish a TCP session with a management device,
      perform, via the TCP session, a secure protocol client/server role reversal for the management device,
      receive, from the management device, information indicating initiation of a secure connection over the TCP session, for a first time between the network device and the management device, in accordance with a secure protocol,
      generate a certificate signing request (CSR) based on the initiation of the secure connection,
         a host key being embedded in the CSR,
      provide, to the management device, a trusted certificate,
         the trusted certificate being dynamically generated based on a cryptographic processor of the network device signing the CSR with the private key,
         the private key being provided to the cryptographic processor for storing prior to signing the CSR with the private key,
         the host key being embedded in the trusted certificate, and
      establish the secure connection with the management device based on an authentication of the host key by the management device via the trusted certificate provided to the management device.

9. The network device of claim 8, where, when performing, via the TCP session, the secure protocol client/server role reversal, the processor is further to:
   provide, to the management device, a role reversal message via the TCP session,
      where the role reversal message provides an identity of the network device.

10. The network device of claim 8, where the secure protocol includes a secure shell (SSH) protocol, and the host key includes a SSH host key.

11. The network device of claim 8, where the trusted certificate includes an X.509-based public key certificate for secure shell authentication.

12. The network device of claim 8, where the private key and another trusted certificate are stored by the cryptographic processor of the network device.

13. The network device of claim 12, where the other trusted certificate includes an X.509-based public key certificate for secure shell authentication.

14. The network device of claim 8, where the trusted certificate is signed by a first certificate authority (CA) with a chain of trust to a second CA trusted by the management device.

15. The network device of claim 8, where the processor is further to:
 generate the host key upon the network device being powered up.

16. The network device of claim 15, where the private key includes a private key specific to the network device.

17. One or more non-transitory computer-readable media storing instructions, the instructions comprising:
 one or more instructions that, when executed by a processor of a device, cause the processor to:
  generate a private key upon the device being powered up,
  initiate a transmission control protocol (TCP) connection to establish a TCP session with a management device after generating the private key,
  perform, via the TCP session, a secure protocol client/server role reversal for the management device,
  receive, from the management device, information indicating initiation of a secure connection over the TCP session in accordance with a secure protocol,
   the secure connection being initiated for a first time between the network device and the management device,
  generate a certificate signing request (CSR) based on the initiation of the secure connection,
   a host key being embedded in the CSR,
  provide, to the management device, a trusted certificate,
   the trusted certificate being dynamically generated based on a component of the device signing the CSR with the private key,
   the private key being provided to the component prior to the component fining the CSR with the private key, and
  establish the secure connection with the management device based on an authentication of the host key by the management device via the trusted certificate provided to the management device.

18. The media of claim 17, where the secure protocol client/server role reversal is performed via a role reversal message that provides an identity of the device.

19. The media of claim 17, where the secure protocol includes a secure shell (SSH) protocol, and the host key includes a SSH host key.

20. The media of claim 17, where the trusted certificate includes an X.509-based public key certificate for secure shell authentication.

21. The media of claim 17, where the component of the device corresponds to an anti-counterfeiting component of the device, and
 where the private key and another trusted certificate are stored by the anti-counterfeiting component of the device.

22. The media of claim 21, where the other trusted certificate includes an X.509-based public key certificate for secure shell authentication.

23. The media of claim 17, where the trusted certificate is signed by a first certificate authority (CA) with a chain of trust to a second CA trusted by the management device.

24. The media of claim 17, the instructions further comprising:
 one or more instructions that, when executed by the processor, cause the processor to:
  generate the host key upon the device being powered up.

* * * * *

UNITED STATES PATENT AND TRADEMARK OFFICE
CERTIFICATE OF CORRECTION

| | |
|---|---|
| PATENT NO. | : 8,868,913 B1 |
| APPLICATION NO. | : 13/248569 |
| DATED | : October 21, 2014 |
| INVENTOR(S) | : Kent A. Watsen |

It is certified that error appears in the above-identified patent and that said Letters Patent is hereby corrected as shown below:

In the Claims

Please correct Claim 17 as follows:

Column 16, line 5, change "fining" to -- signing --.

Signed and Sealed this
Fourth Day of August, 2015

Michelle K. Lee
*Director of the United States Patent and Trademark Office*